US011987754B2

United States Patent
Jokela et al.

(10) Patent No.: US 11,987,754 B2
(45) Date of Patent: May 21, 2024

(54) SOLVOLYSIS PROCESS FOR COMBINED FEEDSTOCK

(71) Applicant: UPM-KYMMENE CORPORATION, Helsinki (FI)

(72) Inventors: Pekka Jokela, Helsinki (FI); Andrea Gutierrez, Helsinki (FI); Roel Westerhof, Enschede (NL); Sascha Kersten, Enschede (NL); Bert Heesink, Enschede (NL)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 18/083,895

(22) Filed: Dec. 19, 2022

(65) Prior Publication Data

US 2023/0203380 A1    Jun. 29, 2023

(30) Foreign Application Priority Data

Dec. 23, 2021 (FI) ...................... 20216335

(51) Int. Cl.
*C10B 53/02* (2006.01)
*C10G 1/02* (2006.01)

(52) U.S. Cl.
CPC ............. *C10B 53/02* (2013.01); *C10G 1/02* (2013.01); *C10G 2300/1011* (2013.01)

(58) Field of Classification Search
None
See application file for complete search history.

(56) References Cited

U.S. PATENT DOCUMENTS

| | | | |
|---|---|---|---|
| 2011/0173875 A1 | 7/2011 | Kleinert et al. | |
| 2012/0005949 A1 | 1/2012 | Stevens et al. | |
| 2014/0099691 A1* | 4/2014 | Iversen | C10G 1/10 435/166 |
| 2014/0128646 A1* | 5/2014 | Iversen | C10G 1/047 422/187 |
| 2018/0002607 A1 | 1/2018 | Bachmann Nielsen et al. | |
| 2023/0203381 A1* | 6/2023 | Gutierrez | C10G 3/40 585/240 |

(Continued)

FOREIGN PATENT DOCUMENTS

| | | |
|---|---|---|
| FR | 2956120 A1 | 8/2011 |
| WO | 2012005784 A1 | 1/2012 |
| WO | 2021209555 A1 | 10/2021 |

OTHER PUBLICATIONS

Finnish Notice of Allowance for the corresponding Finnish Application No. 20216335, dated Aug. 22, 2022; 3 pages.

(Continued)

*Primary Examiner* — Ali Z Fadhel
(74) *Attorney, Agent, or Firm* — CANTOR COLBURN LLP (57) ABSTRACT

The present disclosure relates to a process for converting a combined feedstock to renewable liquid product(s), wherein the ash content of the combined feedstock of lignin feedstock and a second renewable feedstock is low. The combined feedstock is mixed with solvent, followed by solvolysis to obtain a product mix. At least part of the product mix is recirculated as the oil fraction of said solvent. The present disclosure further concerns the use of the product mix as a renewable product or use of hydroprocessed oil obtained by the process.

31 Claims, 2 Drawing Sheets

(56) References Cited

U.S. PATENT DOCUMENTS

2023/0203383 A1* 6/2023 Gutierrez ................ C10G 3/52
585/242

OTHER PUBLICATIONS

Finnish Office Action for the corresponding Finnish Application No. 20216335, dated Mar. 1, 2022; 3 pages.
Lu et al., "Synergistic and Antagonistic Interactions during Hydrothermal Liquefaction og Soybean Oil, Soy Protein, Cellulose, Xylose, and Lignin," ACS Sustainable Chem. Eng., vol. 6, 2018; pp. 14501-14509.

* cited by examiner

SOLVOLYSIS PROCESS FOR COMBINED FEEDSTOCK

CROSS REFERENCE TO RELATED APPLICATION

This application claims priority to Finnish Patent Application No. 20216335 filed Dec. 23, 2021, which is fully incorporated herein by reference.

FIELD OF THE DISCLOSURE

The present disclosure relates to a process for converting a combined feedstock to renewable liquid product(s), wherein the ash content of the combined feedstock of lignin feedstock and a solid second renewable feedstock is below 4.5 wt % and the combined feedstock is mixed with solvent, followed by solvolysis to obtain a product mix. At least part of the product mix is recirculated as the oil fraction of said solvent. The present disclosure further concerns the use of the product mix as a renewable product or use of hydroprocessed oil obtained by the process.

BACKGROUND OF THE DISCLOSURE

Biomass is increasingly recognized as a valuable feedstock to be used as a sustainable alternative to petroleum for the production of biofuels and chemicals.

Renewable energy sources represent the potential fuel alternatives to overcome the global energy crises in a sustainable and eco-friendly manner. In future, biofuels and biochemicals may replenish the conventional non-renewable energy resources due to their renewability and several other advantages.

Biofuels and biochemicals are typically manufactured from feedstock originating from renewable sources, including oils and fats obtained from plants, animals, algal materials and fish. One source is lignocellulosic biomass, which refers to plant biomass that is composed of cellulose, hemicellulose, and lignin. Biofuels and biochemicals originating from lignocellulosic biomass can replace fossil fuels from an energy point of view. However, the conversion of cellulose and hemicellulose into fuels and chemicals often leaves lignin as a by-product and lignin removed for example by the kraft process is traditionally burned for its fuel value, providing energy to power the mill.

After cellulose, lignin is the most prevalent biopolymer on earth, but in contrast to other polymers, lignin is more resistant to degradation. Although, utilization of lignin as a renewable polymeric material is recognized, lignin utilization is still limited, especially since high-lignin containing biomasses are susceptible to tar and char formation, and often produce significant amount of solid residues.

Converting biomass into renewable fuels and chemicals usually involves thermal treatment of the biomass and a promising technology is Hydrothermal Liquefaction (HTL). HTL is usually carried out with liquid water at temperatures between 320° C. and 400° C. To keep the water in the liquid state or supercritical state very high operational pressures of 200 bar or above are needed.

Despite the ongoing research and development in the processing of feedstocks and manufacture of fuels and chemicals, there is still a need to provide an improved process for converting biomass, particularly lignin, to valuable chemicals and hydrocarbons suitable as fuels or fuel blending components.

BRIEF DESCRIPTION OF THE DISCLOSURE

An object of the present disclosure is to provide a conversion process for a combined feedstock of lignin and solid second renewable feedstock, preferably a solid forest industry residue, wherein the combined feedstock has an ash content below 4.5 wt %.

The disclosure is based on the idea of combining two feedstocks, lignin and a solid second renewable feedstock, and introducing the combined feedstock to a solvolysis process according to the disclosure, wherein the combined feedstock has a low ash content.

The object of the disclosure is achieved by the method and use of the obtained product(s) as characterized by what is stated in the independent claims. The preferred embodiments of the disclosure are disclosed in the dependent claims.

An advantage of the process of the disclosure is that by co-processing a combined feedstock of lignin feedstock and a solid second renewable feedstock, typically solid forest industry residue, the feedstock is diversified and biocrude production can be increased by increasing the amount of feedstock from different residues.

An advantage of the process of the disclosure is that the main challenges of prior art hydrothermal liquefaction are avoided, i.e. feeding of the reaction slurry to the reactor at high pressures and temperatures, operating at high pressures associated with the presence of water at high temperatures, operating near supercritical temperature and pressure of water and recovering product at high pressure. Moreover, high temperatures and pressure of water (including salts) under supercritical conditions lead to precipitation of salts that blockage the equipment, which can now be avoided. Further, special materials needed due to harsh conditions or higher amount of aqueous phase or wastewater, resulting in high investment costs for HTL plants, can be avoided.

If the lignin feedstock is obtained from kraft lignin an off load of the recovery boiler in the range of 10 to 20% can be achieved. The process of the disclosure can alternatively, or in addition, be integrated to a pulp mill. Further, the aqueous phase from the solvolysis, which includes the water introduced with the feeds, and the one formed in the process, can optionally be returned to the evaporation step of a pulp mill or to a water treatment plant. The formation of aqueous phase in solvolysis indicates that deoxygenation took place during the reaction.

Recirculating oil as such, or an oil fraction of the product, such as a light fraction or a medium fraction, obtained after fractionation, as solvent in the solvolysis step increases the oil yield and helps avoiding formation of coke and undesired polymerization reactions. Further, the amount of oxygen in the oil products decreases. By adjusting process conditions, temperature and residence time, the oxygen content of the oil products can be altered where lower oxygen contents correspond to a product of better quality. A longer residence time corresponds to a product with lower oxygen content.

Further, as the separation of kraft lignin takes place before the solvolysis, the cooking chemicals are returned to the pulping process at an earlier stage, making sure that the chemical balance of the pulp mill is maintained.

Further, by using an optimized lignin fraction, with a predefined molecular weight for solvolysis, heavy fractions after solvolysis can be avoided. Heavy fractions are known to coke at hydrotreatment conditions and thus, the product of solvolysis using lignin fraction(s) is more suitable to hydrotreatment. Thereto, when heavy fractions obtained from distillation of the solvolysis product are minimized, the yield of the hydrotreatable oil (molecules with smaller $M_w$) yield increases, which is suitable as a product as such or for further treatment. Further, solid fractions after distillation can be avoided or at least minimized.

The operating pressure and product quality can also be controlled by the moisture content of the solid second renewable feedstock, such as sawdust. The moisture content will affect the pressure and the presence of water can enhance reactions that improve the quality of the product. Due to the moisture content of the solid second renewable feedstock and the one formed in the process, water is not trapped into the molecules of the oil after solvolysis and water can be separated from the oil as an aqueous phase. Typically, a clear cut between the phases is obtained, especially at low oxygen content.

In order to reduce the consumption of external energy, heat from one or more product streams can be used to heat up feed streams.

The process of the disclosure is especially suitable for converting a combined feedstock of lignin and a solid second renewable feedstock to valuable products or components, such as hydrocarbons and/or oxygen containing hydrocarbons suitable as fuels, fuel blending components or as feedstock for fuels and for chemicals production.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

An industrially effective and sustainable process for recovering renewable products from a combined feedstock of lignin and a solid second renewable feedstock, typically solid forest industry residues, is provided. The process has a high yield of liquid product(s) and the feedstock is effectively and economically converted to renewable products. The liquid product(s) and especially fractions thereof are particularly suitable as feedstock for hydroprocessing in biofuels and biochemicals manufacture.

A process is proposed for converting a combined feedstock to renewable liquid product(s) as well as the use of the obtained product(s). The object of the disclosure is achieved by the method and use of the product as characterized by what is stated in the independent claims. The preferred embodiments of the disclosure are disclosed in the dependent claims.

The disclosure relates to a process for converting lignin to renewable liquid product(s), wherein the process comprises providing a lignin feedstock; providing a solid second renewable feedstock, preferably solid forest industry residues; providing a solvent comprising an oil fraction, at least partly produced by the process; preparing a feed mixture by mixing a combined feedstock of the lignin feedstock of step and the solid second renewable feedstock with the solvent; followed by solvolysis of the feed mixture by heating the feed mixture at a temperature between 360 and 420° C., under a pressure from 40 to 155 bar and maintaining said temperature and pressure for 2-60 minutes to obtain a product mix. Typically, at least part of the product mix is recirculated as the oil fraction of the solvent and the ash content of the combined feedstock is low, preferably below 4.5 wt %.

According to some embodiments of the disclosure the feed mixture is prepared by mixing the combined feedstock and solvent, at a temperature between 100 and 130° C., at a pressure from 1 bar to 10 bar, for 5-30 min. The mixing of the feedstock can be facilitated by mechanical treatment using different kind of mechanical equipment such as stirrer, pump etc. for example a piston pump. The obtained feed mixture is pumpable. Optionally, the feed mixture is subjected to filtration where a feed mixture of lignin fraction(s) and solvent is obtained as filtrate before the solvolysis. Alternatively, the feed mixture as a whole is subjected to solvolysis after the pretreatment by mixing. During the solvolysis step, where thermal conversion and liquefaction take place, the mixture is heated to a temperature between 360 and 420° C. At this temperature the pressure increases up to between 40 (4 MPa) and 155 bar (15.5 MPa). The residence time, i.e. the time the temperature and pressure of the solvolysis step is maintained, is typically 3-60 minutes, preferably 5-40 minutes, most preferably 5-30 minutes. A product mix is obtained, and it is typically directed to a separation step, typically comprising washing and/or filtration, where solids/char is typically separated from the liquid product(s) and a liquid product mix is obtained. Typically, if an aqueous phase is formed during the solvolysis, it is separated from the product before the product mix or a fraction of the product mix is recirculated. The aqueous phase can be removed by decanting or as part of the washing. Water can be formed in the solvolysis due to deoxygenation reactions. Typically, the separated solids form a cake comprising oil. In order to increase the oil yield, this oil is optionally separated from the solids by washing or separating by steam. Optionally the solids are first washed and then separated for example by filtration, sedimentation and/or decanting. The solids, if present and separated, are typically unconverted heavy compounds of lignin, unconverted second renewable feedstock or the result of polymerization at the reaction conditions. At least part of said liquid product(s) are recirculated back to the pretreatment step as the oil fraction of the solvent. Typically, the oil fraction is a fraction, such as a light or medium fraction, obtained by fractionation of the product mix obtained from the thermal liquefaction and/or by fractionation of the liquid product mix obtained after separation.

The disclosure further relates to use of the product mix, or a liquid product mix separated from the product mix, as a renewable product, preferably in marine fuel applications, applications relating to heating or as feed in a hydroprocessing step. Moreover, the disclosure relates to use of hydroprocessed oil obtained when the product mix, or an oil fraction obtained from fractionation of the product mix or the liquid product mix, is directed to a hydroprocessing step. The hydroprocessed oil is preferably used in the production of chemicals, marine fuel, in drop-in fuels, preferably as diesel, naphtha or jet-fuel.

According to some embodiments of the disclosure the product mix or part of it, is directed to fractionation before recirculating part of the liquid product to preparation of feed mixture, but the product mix or liquid product mix can also be recirculated as such. Typically, one or more oil fraction(s) and a heavy fraction as well as optionally gases and a bottom residue fraction are separated. In some embodiments of the disclosure one or more light or medium fractions are separated as oil fraction(s). The fractionation may be for example fractional distillation utilizing at least one fractionation distillation column. Typically, the light fraction or medium fraction is the part of the product mix used as oil fraction in the solvent in the thermal liquefaction of the process. Optionally part of the product mix, for example the light fraction or medium fraction, is directed to hydroprocessing, such as hydrotreatment or hydrocracking instead of or in addition to being directed to fractionation.

In the present specification and claims, the following terms have the meanings defined below.

The term "lignin" as used herein, refers to lignin obtained from different sources. One example is kraft lignin obtained from kraft pulping but the lignin could also be obtained from other sources such as lignosulfonate lignin, soda lignin and organosolv lignin. The lignin obtained as a residue from the lignocellulosic process is also be suitable feed for this invention and any other lignin obtained from other process. More in general lignin is a complex long-chain heterogeneous organic polymer composed largely of phenylpropane units which are most commonly linked by ether bonds. Oxidative coupling of primarily three p-hydroxycinnamyl alcohols (monolignols): p-coumaryl, coniferyl and sinapyl alcohols results in lignin. Lignin have generally been classified into three major groups based on the chemical structure of their monomer units: softwood lignin, hardwood lignin, and grass lignin. Hardwood lignin consists mainly of guaiacyl and syringyl units and low levels of p-hydroxyphenyl. Conifer lignin has higher levels of guaiacyl units and low levels of p-hydroxyphenyl. Grasses comprise guaiacyl, syringyl and p-hydroxyphenyl units. In some embodiments of the disclosure, the lignin feedstock of the embodiments of the disclosure is typically kraft lignin, which is separated from black liquor. The kraft lignin feedstock of the embodiments of the disclosure essentially consists of lignin, i.e. the feedstock is substantially free of impurities or residues from black liquor, such as cellulose, hemicellulose, methanol, sulphur compounds and cooking chemicals from the kraft process.

The term solid "second renewable feedstock", as used herein, refers to solid forest industry residues, including forest residues. Typically, the solid forest industry residues are, bark, sawdust, wood chips and other wood residues of softwood and hardwood residues from the forest industry as well as cutting residues, for example branches and treetops of softwood and hardwood.

The term "combined feedstock", as used herein, refers to the combined feedstock of lignin and a solid second renewable feedstock of the process.

The term "solvent", as used herein, refer to the solvent used for pretreatment of the combined feedstock of lignin and a solid second renewable feedstock of the process. The solvent comprises an oil fraction, at least partly recirculated from the process itself, typically a fraction, such as a light or medium fraction separated from the product mix by fractionation. The solvent may further comprise other renewable hydrocarbons, oxygen containing hydrocarbons or mixtures thereof.

The term "oil fraction", as used herein, refer to the product mix or part thereof obtained from the solvolysis process and recirculated to the pretreatment to be, at least part of, the solvent of the process.

The term "feed mixture" is the heterogenous or homogeneous mixture obtained after mixing lignin or lignin fraction(s) with solvent according to the disclosure.

The kraft lignin feedstock from which lignin fraction(s) of some embodiments of the disclosure are obtained essentially consists of lignin, i.e. the lignin feedstock is substantially free of impurities or residues from black liquor such as cellulose, hemicellulose, methanol, sulphur compounds and cooking chemicals from the kraft process. Typically, the lignin feedstock comprises below 1 wt % of impurities or residues from the black liquor, preferably below 1 wt %, more preferably below 0.1 wt % of sulphur compounds and cooking chemicals.

According to embodiments of the disclosure the solvent is the oil as such, or an oil fraction produced by the process itself, or comprises oil or an oil fraction, at least partly recirculated from the process itself. Typically, the solvent is or comprises a light fraction such as a light and/or medium fraction separated from the product mix, preferably by fractionation, such as distillation, evaporation, liquid-liquid extraction, ultra filtration and nanofiltration, etc. The light fraction comprises 5- and 6-carbon cyclic structures with double bonds or saturated ring, containing keto-groups and/or 1-3-methyl groups, phenolic structures with methyl-, methoxy-, propenyl-, carboxyl- side groups, and hydrated phenantrene 3-ring structures with 3-4 double bonds in the ring and side chains. The light fraction typically has an average molecular weight of approximately 150 g/mol and the medium fraction typically has a molecular weight of between 150 g/mol and the average molecular weight of the whole oil.

According to embodiments of the disclosure the solvent further comprises other renewable hydrocarbons, oxygen containing hydrocarbons or mixtures thereof, for example crude tall oil, acid oil and/or vegetable oil. Suitable vegetable oil is for example Brassica carinata oil and/or Jatropha oil. Typically, the solvent does not comprise added alcohols, i.e. in the embodiments of the disclosure there is typically no need to add any alcohols to the solvent used for pre-treatment, i.e. for preparing the feed mixture, or directly to the thermal liquefaction step of the process.

In the embodiments of the disclosure, the amount of combined feedstock is typically 5 wt % to 35 wt % and the amount of solvent 65 wt % to 95 wt % making up the feed mixture of the embodiments of the disclosure. Preferably the amount of combined feedstock is 8 wt % to 25 wt %, more preferably 10 to 20 wt %, including the amount of lignin being between two of the following amounts; 5 wt %, 6 wt %, 7 wt %, 8 wt %, 9 wt %, 10 wt %, 15 wt %, 20 wt %, 25 wt %, 30 wt % and 35 wt % of the feed mixture, the rest being solvent. Typically, the combined feedstock consists of 10-90 wt % of the lignin feedstock and 10-90 wt % of the solid second renewable feedstock, more preferably the combined feedstock consists of amount of lignin being between two of the following amounts 10 wt %, 20 wt %, 30 wt %, 40 wt %, 50 wt %, 60 wt %, 70 wt %, 80 wt % and 90 wt % of the combined feedstock and the rest being solid second renewable feedstock.

In embodiments of the disclosure, the ash content of the combined feedstock is typically below 3 wt %, preferably below 2 wt %, more preferably below 1 wt %, most preferably below 0.5 wt %.

According to the embodiments of the disclosure, typically the temperature when feed mixture is prepared by mixing the combined feedstock with a solvent, is adjusted to a temperature selected from between 100° C. and 130° C., more preferably between 110° C. and 125° C., including the temperature being a temperature between two of the following temperatures; 100° C., 105° C., 110° C., 115° C., 120° C., 125° C. and 130° C. for the heating of the mixture at a pressure from 1 to 10 bar, preferably 1 to 5 bar, more preferably 1 to 3 bar. The reaction time or the residence time, in case this step is part of the continuous process, is typically 5-30 minutes, preferably 5-15 minutes, not including the heating time. In the embodiments of the disclosure the pretreatment step can be carried out batch-wise or in continuously operated reactors.

According to the embodiments of the disclosure, the temperature of the thermal liquefaction step is adjusted to a temperature selected from between 360° C. and 420° C., more preferably between 370° C. and 400° C., including the temperature being a temperature between two of the following temperatures; 370° C., 375° C., 380° C., 385° C., 390° C., 395° C., 400° C., 405° C., 410° C., 415° C. and 420° C. for the heating of the feed mixture of the pretreatment step at a pressure from 40 to 155 bar, preferably from 50 bar to 150 bar, more preferably from 50 to 130 bar, including the pressure being between two of the following pressures; 40 bar, 45 bar, 50 bar, 55 bar, 60 bar, 70 bar, 80 bar, 90 bar, 100 bar, 110 bar, 120 bar, 130 bar, 140 bar, 145 bar, 150 bar or 155 bar.

The reaction time of the thermal liquefaction step or residence time, in case this step is part of a continuous process, is typically 3-60 minutes, preferably 5-40 minutes, most preferably 5-30 minutes not including the heating time.

The process of the embodiments of the disclosure, or parts thereof, can be a continuous, batch or semi-batch process.

In an embodiment of the disclosure, the renewable liquid product comprising oil may be subjected to a fractionation step. A gaseous fraction, if any, one or more light and/or medium liquid fraction and a heavy liquid fraction may be obtained. Further, a bottom residue fraction typically comprising solids may be separated.

In embodiments of the disclosure, the product mix or the liquid product mix may be used as a renewable product, for example in marine fuel applications or applications relating to heating or it may be directed to a hydroprocessing step.

In further embodiments of the disclosure, the light and/or medium liquid fraction(s), obtained by fractionation of the optionally washed and filtered liquid product mix, may be directed to a hydroprocessing step to obtain hydroprocessed oil, which can be used inter alia in production of chemicals, marine fuel, in drop-in fuels such as diesel, naphtha, and jet-fuel.

Figure 1:
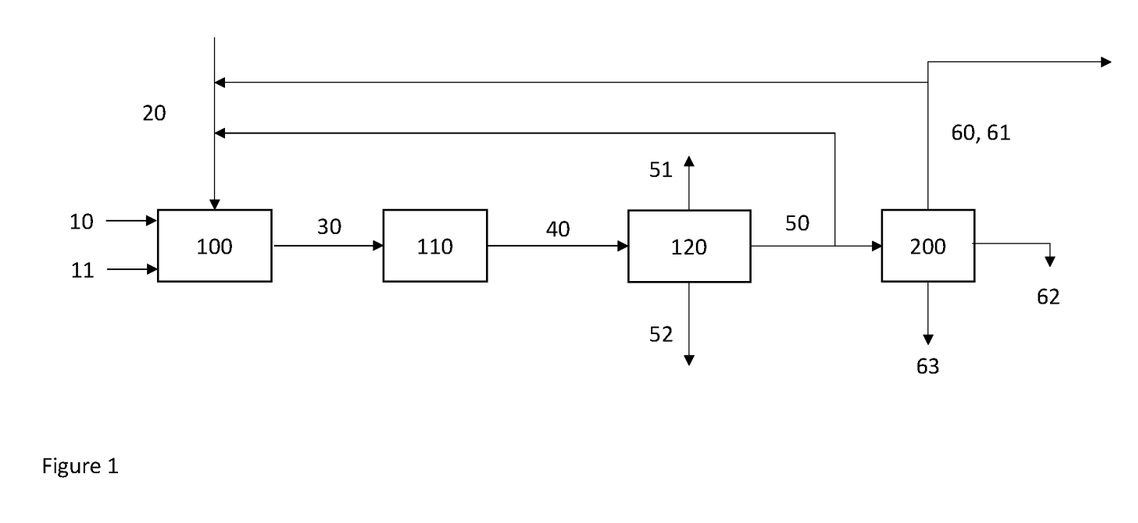
FIG. 1 shows a schematic flow diagram representing one embodiment of the conversion process.

In FIG. 1 lignin feedstock 10 and a solid second renewable feedstock 11 is fed to a pretreatment step 100 together with solvent 20. The obtained feed mixture 30 is then fed to a solvolysis step 110 where it is heated. The product mix 40 obtained from the solvolysis step 110 is directed to separation step 120, typically comprising washing and filtration where char/solids 52 and a liquid product mix 50 are separated, optionally gas 51 is separated. The liquid product mix 50 is directed to fractionation 200 and/or optionally at least part of the liquid product mix 50 is recirculated to be used as at least part of the solvent 20 in the pretreatment step 100. Optionally, part of the liquid product mix 50 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 60, a medium fraction 61, a heavy fraction 62 and an optional bottom residue fraction 63 are separated. Optionally at least part of the light fraction 60 is recirculated to be used as at least part of the solvent 20 in the pretreatment step 100. Optionally the light fraction 60 or part of it, is directed to hydroprocessing and/or the heavy fraction 61 is directed to a recovery boiler or to cracking or hydrocracking (not shown in the figure).

Figure 2:
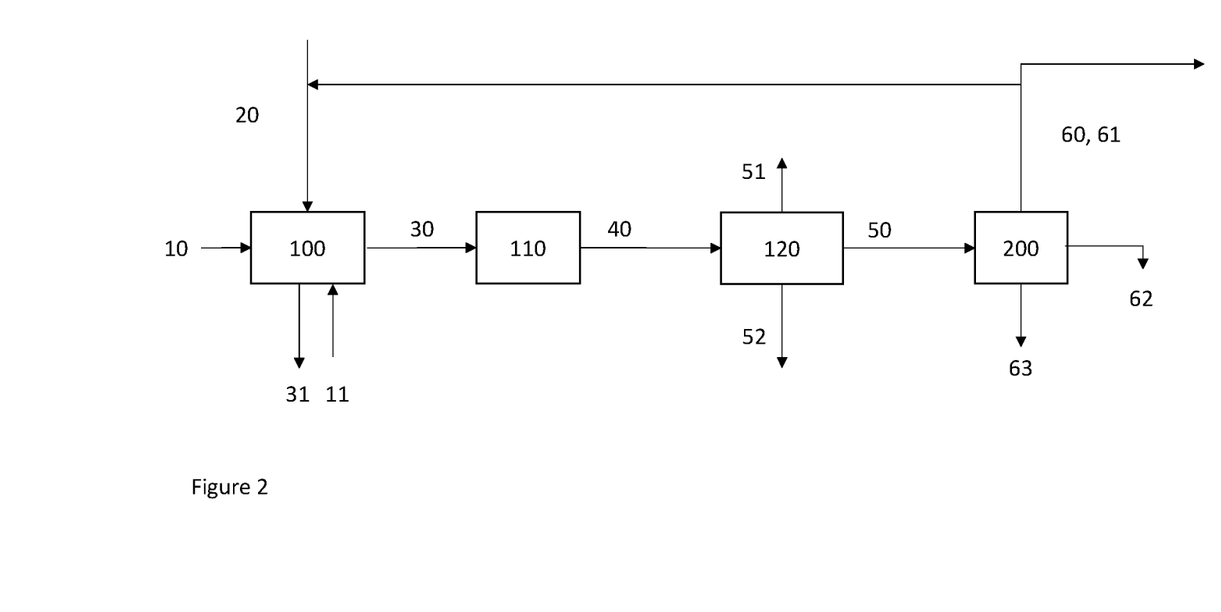
FIG. 2 shows a schematic flow diagram representing one embodiment of the conversion process.

In FIG. 2 lignin feedstock 10 is fed to a pretreatment step 100 together with solvent 20. The mixture is filtrated (not shown) and solids 31 are removed. The mixture of lignin fraction (not shown) in the solvent, is mixed with a solid second renewable feedstock 11, and a feed mixture 30 is obtained. The feed mixture 30 is fed to a solvolysis step 110 where it is heated. The product mix 40 obtained from the solvolysis step 110 is directed to separation step 120, typically comprising washing and filtration where char/solids 52 and a liquid product mix 50 are separated, optionally gas 51 is separated. The liquid product mix 50 is directed to fractionation 200 and/or optionally part of the liquid product mix 50 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 60, a medium fraction 61, a heavy fraction 62 and an optional bottom residue fraction 63 are separated. Optionally at least part of the light fraction 60 is recirculated to be used as at least part of the solvent 20 in the pretreatment step 100. Optionally the light fraction 60 or part of it, is directed to hydroprocessing and/or the heavy fraction 61 is directed to a recovery boiler (not shown in the figure).

Lignin

The lignin feedstock of the embodiments of the disclosure is obtained from different sources and produced in different ways that involves separation of lignin. Examples of different lignin sources are kraft lignin obtained from kraft pulping, lignosulfonate lignin obtained from a sulfite pulping process, soda lignin from pulp mills using a soda pulping process, organosolv lignin where lignin is isolated from carbohydrates in lignocellulosic biomass using organic solvents and lignin obtained in the lignocellulosic ethanol production.

In some embodiments of the disclosure, the lignin feedstock, or lignin fraction(s) thereof, is obtained from kraft lignin, which essentially consists of lignin, i.e. the lignin feedstock is substantially free of impurities or residues from black liquor, such as cellulose, hemicellulose, methanol, sulphur compounds and cooking chemicals from the kraft process, preferably the lignin feedstock comprises less than 10 wt %, more preferably the lignin feedstock comprises less than 5 wt % % and most preferably less than 1 wt % of impurities or residues from the black liquor. Preferably the lignin is cellulose-free. Typically, the kraft lignin feedstock comprises below 1 wt %, more preferably below 0.1 wt % of sulphur compounds and cooking chemicals.

The kraft process (also known as kraft pulping or sulfate process) is a process for conversion of wood into wood pulp, which consists of almost pure cellulose fibers, the main component of paper. The process involves the conversion of wood to pulp using an aqueous mixture containing sodium hydroxide and sodium sulphide. These chemicals remove the lignin links between cellulose fibres, thereby releasing the fibres and producing water-soluble compounds. The kraft pulping process is well-known and it is known that it removes most of the lignin originally present in the wood. The liquid separated from pulp is commonly referred to as "crude black liquor" or "weak black liquor". The term "black liquor" refers to the aqueous liquid residue of the kraft pulping process which has been separated from solid wood pulp (cellulose fibres). The black liquor contains dissolved wood degradation products such as lignin and hemicellulose fragments, as well as methanol, sulphur compounds and dissolved inorganic solids such as spent pulping chemicals. The methanol content is typically in the range of 0.5-1.5 wt. % based on the mass of dry solids. Sulphur compounds are typically contained in the black liquor in an amount of 2-7 wt. % based on the mass of dry solids.

An acidification process has been considered as an efficient and economical process for the isolation of lignin from black liquor. One example of black liquor acidification for lignin extraction is adding acid e.g., sulfuric acid to change the pH of black liquor. Other typical processes for obtaining lignin from black liquor are using filtration and ultrafiltration.

A typical lignin feedstock is a composition comprising 15-98 wt % organics, 0.1-15 wt % ash and/or 1.5-80 wt % water. Typically, the oxygen content of the composition is below 40 wt %, preferably from 20 to 36 wt %, most preferably from 25-36 wt % daf (dry-ash-free). In preferred embodiments of the disclosure; the amount of organics is 30-98 wt %, more preferably 30-70 wt %, most preferably 50-70 wt %; the amount of ash is 0.1-7 wt %, more preferably 0.1-3 wt %, most preferably 0.1-1 wt %, including the ash content being between two of the following values; 0.1 wt %, 0.2 wt %, 0.3 wt %, 0.4 wt %, 0.5 wt %, 1 wt %, 1.5 wt %, 2 wt %, 2.5 wt %, 3 wt %, 3.5 wt %, 4 wt %, 5 wt %, 6 wt %, 7 wt %, 8 wt %, 9 wt %, 10 wt %, 11 wt %, 12 wt %, 13 wt %, 14 wt % and 15 wt %; and/or the amount of water is 20 -70 wt %, more preferably 25 -70 wt %. If needed, the lignin feedstock can be dried. The moisture content of the lignin feedstock entering the process of the disclosure is typically below 35 wt %, preferably below 25 wt %, more preferably below 20 wt %.

In some embodiments of the disclosure, the lignin feedstock is a lignin fraction chosen based on its molecular weight. Optionally the average molecular weight is evaluated in combination with polydispersity of the lignin feedstock. Typically, the lignin fractions are obtained by filtration, nanofiltration, acid precipitation process or membrane fractionation. Lignin can be subjected to gradient acid precipitation to obtain lignin fractions with narrow molecular weight distribution. During gradient acid precipitation lignin fractions obtained at higher pH value exhibit higher molecular weight compared with the fractions obtained at lower pH. The fractionation can also be achieved by dissolving lignin in solvent used in the solvolysis, followed by filtration where after a feed mixture of a lignin fraction and solvent is obtained as the filtrate. Since small particles have larger surface area they dissolve better and a lignin fraction with a lower molecular weight is obtained. Typically, the average molecular weight of the lignin fraction is below 6500 g/mol, preferably below 4000 g/mol, more preferably below 2000 g/mol, most preferably below 1500 g/mol.

The molecular weight distribution can for example be determined using Gel Permeation Chromatography (GPC). GPC is an analytical technique that separates dissolved macromolecules by size based on their elution from columns filled with a porous gel. GPC/SEC employs a stagnant liquid present in the pores of beads as the stationary phase, and a flowing liquid as the mobile phase. The mobile phase can therefore flow between the beads and also in and out of the pores in the beads. The separation mechanism is based on the size of the polymer molecules in solution. Bigger molecules will elute first. Small molecules that can enter many pores in the beads take a long time to pass through the column and therefore exit the column slowly. To determine the molecular weights of the components of a polymer sample, a calibration with standard polymers of known weight must be performed. Values from the unknown sample are then compared with the calibration graph. This method is relative and retention times depends on the used column material, eluent and how similar the used standards are compared to the samples.

Forest Industry Residues

The forest industry residues of the embodiments of the disclosure are typically residues from forest industry such as bark, sawdust, wood chips, other wood residues or a combination thereof. The forest industry residues are typically produced at an industry area, such as sawdust by timber industry or de-barking at pulp industry.

In some embodiments of the disclosure, the solid forest industry residues are solid forest residues such as cutting residues, for example branches and treetops.

Typically, the solid second renewable feedstock is solid forest industry residues, including solid forest residues, preferably the solid second renewable feedstock is bark, sawdust, wood chips, branches, treetops or mixtures thereof, more preferably bark, sawdust, wood chips or mixtures thereof.

Typical compositions of sawdust, bark and forest residues of the embodiments of the disclosure are shown in Table 1.

TABLE 1

Composition of different forest industry residues by weight.

| Description | Unit | Method | Spruce sawdust | Pine sawdust | Spruce bark | Pine bark | Forest residue |
|---|---|---|---|---|---|---|---|
| Dry content 105° C. | % | Internal | 46.2 | 45.9 | 55.8 | 42.2 | 42 |
| Carbon, C | % | ASTM D5291 | 49.40 | 49.93 | 49.50 | 54.10 | 47.2 |
| Hydrogen, H | % | ASTM D5291 | 6.34 | 6.36 | 5.93 | 5.57 | 5.4 |
| Nitrogen, N | % | ASTM D5291 | 0.10 | 0.08 | 0.27 | 0.23 | 0.7 |
| Sulphur, S | % | ASTM D4239 | 0.00 | 0.00 | 0.02 | 0.02 | 0.005 |
| Oxygen, O | % | ASTM D5291 | 43.31 | 43.01 | 41.90 | 38.00 | 46.65 |
| Ash 550° C. | % | SFS-EN 14775 | 0.3 | 0.2 | 2.4 | 2.1 | 3.5 |

Typically, the ash content of the solid forest industry residue is 0.1-5 wt %, preferably 0.1-4 wt %, more preferably 0.1-2.5, most preferably 0.1-1 wt %, including the ash content being between two of the following values; 0.1 wt %, 0.2 wt %, 0.3 wt %, 0.4 wt %, 0.5 wt %, 1 wt %, 1.5 wt %, 2 wt %, 2.5 wt %, 3 wt %, 3.5 wt %, 4 wt % and 5 wt %.

The solid forest industry residue is typically dried to a moisture content below 20 wt %, preferably below 15 wt %, more preferably between 10 wt % and 20 wt % and most preferably between 10 wt % and 15 wt % before it is entered into the process of the disclosure.

Optional Fractionation of the Product Mix

The obtained product mix may optionally be fractionated in a fractionation step before being used as a renewable product. A gaseous fraction, if any, one or more light and/or medium fraction(s) and a heavy fraction as well as a bottom residue fraction comprising solids, if any, may be obtained. The fractionation may be carried out after washing, filtering and/or drying the product mix.

The gaseous fraction typically comprises water, carbon dioxide and light gaseous ($C_1$-$C_4$) compounds.

The vacuum residue of the product mix is typically above 10 wt. %. The heavy fraction may be directed to hydrocracking, energy production, recovery boiler, etc.

In an embodiment, the liquid product mix may be directed to a hydroprocessing step without fractionation.

In embodiments of the disclosure, one of the fractions, typically a light or medium fraction, obtained by fractionation of said product mix or liquid product mix, may be directed to a hydroprocessing step and/or at least part of the light fraction may be used as solvent in the pretreatment step of the process.

The fractionation may be carried out as evaporation, distillation, extraction, ultra filtration and nanofiltration or as a combination of any of these.

Fractions comprising the gaseous fraction, the light and/or medium liquid fraction(s) and the heavy liquid fraction can be separated. A person skilled in the art is able to vary the fractionation/distilling conditions and to change the temperature cut point as desired to obtain any desired fraction, boiling in the predetermined ranges.

Alternatively, a combination of different methods may also be used.

Optional Hydroprocessing Step

In the embodiments of the disclosure, the product mix, the light fraction obtained for example by fractionation of the product mix, or any other fraction of the product mix, may be subjected to a catalytic hydroprocessing step carried out in the presence of hydrogen, to yield an effluent, which may be subjected to a second fractionation and/or further processing steps for providing liquid fuels and other chemicals. Gasoline fractions that can be used as a bio-naphtha component or as raw material for bio-plastics may also be produced.

The hydroprocessing step may be carried out for effecting at least one of hydrodeoxygenation, hydrodewaxing, hydroisomerization, hydrocracking, hydrodearomatization and ring opening reactions.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina ($Al_2O_3$), gamma-alumina, zeolite-alumina, alumina-silica ($SiO_2$), $ZrO_2$, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of H2/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 h-1, suitably 0.1-5 h-1.

The hydroprocessing step may be carried out as at least one-step process or as at least two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

EXAMPLES

Analysis Methods Used in the Examples

Gas samples were analysed with an off-line Varian rapid gas chromatograph RGA-450GC with two analytical columns (10 m Molsieve 5A and 10 m PPQ), and with an off-line Agilent 7890A gas chromatograph equipped with three analytical columns and three different detectors (0.9 m Supelco 12255 U column and TCD detector for the quantification of CO2 and H2S, 10 m DB1 column and FID detector for the quantification of light hydrocarbons and, 10 m Moisieve 5A column and TCD detector for the quantification of O2, H2, N2 and CO), using helium as carrier gas in all cases.

The molecular weight distribution of the lignin and lignin fractions was determined with a Gel Permeation Chromatograph (GPC) using a Dionex Ultimate 3000 Autosampler (column compartment and pump), Dionex Ultimate 3000 Diode Array Detector and as a reflective index detector, Shodex RI-101. The columns were PSS MCX columns, precolumn and two analytical columns of sulfonated divinylbenzen copolymer matrix (1000 Å and 100 000 Å). The syringe filters were 0.45 μm and glass sample bottles for STD samples. Sample filtration was performed with a Mini-Uniprep syringeless filter device PTFE or Nylon, 0.45 μm. For prefiltration 5 μm syringe filter was used.

The eluent was prepared from high quality deionized water of low resistivity (18 MΩ-cm or better) that contains as little dissolved carbon dioxide as possible was used to prepare the eluent. The water was also free of biological contamination (e.g., bacteria and molds) and particulate matter. The water was first degassed and after this, the water was poured carefully into 2000 ml measurement bottle and exactly 10.4 ml of 50% NaOH were added. The standard samples for calibration were prepared by weighting approximately 50 mg of each standard into a 10 ml measuring bottle and ultrapure water was added and filled into a mark. Standards were filtered with PTFE 0.45 μm syringe filters. After running the calibration samples, calibration results were integrated and processed in the processing method and saved. The strong alkaline liquor samples were diluted normally 1:100 and filtered with PTFE syringe filters (0.45 μm) to vials. Ready samples were load into autosampler and sample information was added to sample sequence. Injection volume was 20 μl. After the samples 1 M NaOH was injected as a sample to clean the column. The instrument parameters were the following flow rate 0.5 ml/min, eluent 0.1 M NaOH, oven temperature 30° C., isocratic run and run time 48 minutes. The results were integrated, and the following parameters were reported: number average molar mass Mn, mass average molar mass Mw, and polydispersity PD. The results are reported as integers.

The molecular weight distribution of the oil phase was determined with a Gel Permeation Chromatograph (GPC) of the Agilent 1200 series, applying IR and UV light (wavelength 254 nm) and 3 GPC PLgel 3 Im MIXED-E columns placed in series. The columns were operated at 40° C. and tetrahydrofuran (THF) was used as a solvent. Calibration was performed with a solution of polystyrene with molecular weights ranging from 162 to 30230 g/mol.

Calculation of average molecular weight and polydispersity $$M_n = \frac{\Sigma n_i M_i}{\Sigma n_i} \quad \text{(Eq. 1)}$$

$$M_w = \frac{\Sigma w_i M_i}{\Sigma w_i} \quad \text{(Eq. 2)}$$

$$PD = \frac{M_w}{M_n} \quad \text{(Eq. 3)}$$

where: $M_i$ is the molecular weight of molecules i, $n_i$ is the number of molecules with molecular weight i and $w_i$ is the mass of the molecules with molecular weight i. $M_w$ is weight average molecular weight, $M_n$ is the number average molecular weight and PD is the dispersity.

The elemental composition of the liquid and solids was determined with an Interscience Flash 2000 elemental analyser. The water content of the aqueous phase was determined by Karl Fischer titrations using Hydranal composite 5, Metrohm 787 KFTitrino as titrant. The pH of the aqueous phase, obtained after the experiments, was measured with a Metrohm 785 DMP titrino apparatus.

The contents of ash, volatile matter, moisture and fixed carbon in the lignin and sawdust (proximate analysis) were determined by measuring weight loss upon heating. These constituents will add up to 100%. Ash content determination was performed by heating a lignin or sawdust sample in air at a slow heating rate (5° C./min). Once the temperature reached 550° C. it was kept constant for 6 hours before the sample was weighted. The remaining weights measured at 520° C. represent the ash contents at these temperatures.

The combined content of fixed carbon and volatiles was determined by slowly heating a lignin or sawdust sample (5° C./min) in nitrogen to 950° C. where it was maintained for 10 minutes before it was weighted. The measured weight loss represents the combined content of water and volatiles. The remaining weight represents the content of fixed carbon.

The moisture content of the lignin and sawdust was determined by a PMB-53 moisture analyzer of Adam Equipment.

Calculations of Mass Balance and Yields

The mass balance distinguishes four different product phases—oil (o), aqueous phase (aq), gas (g) and solids (s). The produced amounts of each phase are determined as follows:
1. Oil—is the liquid phase collected after the experiment.
2. Aqueous phase organics (water soluble organics—WSO) remain in the oil phase. Only when 20 wt % of water was used in the slurry mixture of lignin and lights, a separate water layer was observed which contains almost no organics molecules.
3. Gas—From the known volume of produced gas and GC composition, the weight of total gas is calculated and the amount of measured $N_2$ is subtracted. The known volume of produced gas and the average molar weight of 33 g/mol are used calculate the amount of gas produced. Nitrogen is subtracted based on the initial pressure and the approximate initial volume taken up by gas phase in the reactor at the start of an experiment.
4. Solids (char)—The amount of solids is determined directly by weighing dried solids when withdrawn from the oven.

Since all yields are given on dry lignin basis, the amount of dry lignin fed in the autoclave is corrected for initial lignin moisture as follows:

$$m_{feed,dry} = m_{feed}(1 - w_{moisture,feed}) \quad \text{(Eq.4)}$$

The gas and solid yields are calculated by:

$$Y_{product} = \frac{m_{product}}{m_{feed,dry}} \quad \text{(Eq. 5)}$$

$Y_S$ is used for the solids and $Y_G$ for the gas. The oil yield is calculated as 100 minus gas and char. When the yields are expressed on the feed intake, all solids and gas are first ascribed to the lignin, lignin fractions and lignocellulosic material after that, the amount of gas produced from the lights only are subtracted from the gas production from the lignin, lignin fractions and lignocellulosic material. The oil yield from lignin, lignin fractions and lignocellulosic material follows from 100 minus gas and solids from lignin.

Vacuum Residue and Average Molecular Weight

Both vacuum residue (VR) and average molecular weight ($M_w$) are excerpted from GPC analysis. The parameters are based on the results from the refractive index detector (RID) of the GPC analyser. Molecular weight is taken directly from the GPC output file, whereas vacuum residue is calculated as follows:

$$VR = \frac{\text{Area of molecules heavier than 1000 g/mol}}{\text{Total Area}} \times 100 \quad \text{(Eq. 6)}$$

The areas are calculated using numerical integration (trapezoidal method).

$$\text{Area} = \int_{logMw,1}^{logMw,2} RID\, d(\log M_W) \quad \text{(Eq.7)}$$

Oxygen Content

With the applied recovery procedure, a small fraction of water always remained in the oil phase. Therefore, the oxygen content is corrected for the oxygen in water. The water content of the oil sample ($KFT_{oil}$ in wt. %) is known from Karl Fischer titration and therefore the obtained oxygen content including that of water ($O_{wet}$) can be corrected to obtain the oxygen content of the oil on dry basis (O):

$$O = \frac{O_{wet} - \frac{16}{18} \cdot KFT_{oil}}{\left(1 - \frac{KFT_{oil}}{100}\right)} \quad \text{(Eq. 8)}$$

The same procedure holds for the hydrogen content in the oil:

$$H = \frac{H_{wet} - \frac{2}{18} \cdot KFT_{oil}}{\left(1 - \frac{KFT_{oil}}{100}\right)} \quad \text{(Eq. 9)}$$

Example 1. Pretreatment of Lignin+Sawdust

Mixtures containing different rations of lignin according to Table 2 and pine sawdust according to Table 1 (dried to moisture content 4 wt %) were mixed with m-cresol (oxygen content m-cresols=14.8 wt %) and tested in solvolysis. The total amount of biomass (lignin+sawdust) in the feed mixture was 15 wt-% (by dry weight) and the rest, 85 wt-% was m-cresol. The ratios of dry lignin and dry sawdust were 75 wt-% lignin +25 wt-% sawdust and 50 wt-% lignin+50 wt-% sawdust. A feedstock of only lignin (100%, comparative) and only sawdust (100%, comparative) were used as feedstock.

TABLE 2

| Kraft lignin composition | |
| --- | --- |
| Ash, wt % | <1 |
| Organics, wt % | 69 |
| Moisture, wt % | 30 |
| Molecular weight Mw, g/mol | 3406 |

The mixture was placed in a reactor vessel and heated to a temperature of 120° C. at 1-2 bar pressure. The mix was mixed for 60 minutes and the obtained feed mixture was used as feedstock for solvolysis.

Example 2. Solvolysis

The feed mixtures obtained in Example 1 were used for solvolysis in a batch reactor. The reactor temperature was 380° C. and the reaction time was 10 minutes (at set-point). The pressure was between 70 and 80 bar.

The results for the feed mixtures containing 75 wt-% of lignin/25 wt-% sawdust and 50 wt-% of lignin/50 wt-% sawdust, are compared with the results obtained for 100 wt-% lignin and 100 wt-% sawdust, i.e. 100 wt-% of lignin/0 wt-% sawdust and 0 wt-% of lignin/100 wt-% sawdust are shown in Table 3. The water yield in Table 3 is water produced from the lignin and sawdust feedstocks (or mixtures) during solvolysis, thus excluding feedstock moisture.

TABLE 3

Solvolysis of lignin, sawdust and mixtures thereof; product yield and oil quality.

| | Oil yield wt %, dry | Solid yield wt %, dry | Gas yield wt %, dry | Water yield wt %, dry | Oxygen oil in cresol wt %, dry | $M_w$ oil g/mol | PD |
| --- | --- | --- | --- | --- | --- | --- | --- |
| 100% lignin | 87 | 1 | 5 | 8 | 18.7 | 1889 | 1.94 |
| 75 wt % lignin + 25 wt % sawdust | 83 | 0 | 6 | 11 | 22.3 | 1409 | 1.70 |
| 50 wt % lignin + 50 wt % sawdust | 76 | 1 | 8 | 15 | 22.5 | 1134 | 1.54 |
| 100 wt % sawdust | 62 | 0 | 11 | 26 | 17.5 | 705 | 1.21 |

As seen based on the results the mixture of sawdust and lignin can be converted efficiently in the solvolysis process. High organic yields were obtained (oil), and the amounts of aqueous phase (water) formed indicate that deoxygenation reactions take place. Both the oil production and water production were high for sawdust, meaning that predominately oxygen was removed. Since almost no solids were produced carbon is mainly removed by the produced gases. The gas yield increases with increases wt % of sawdust in the feed. The average molecular mass and polydispersity (PD) decreases with increasing wt % of sawdust in the feedstock. The oxygen content of the oil product was between 17.5 and 22.5 wt-%. These oils are all suitable for further processing, for example for hydrotreatment.

When the reaction time of lignin solvolysis (at 380° C.) was extended from 10 to 20 minutes the oxygen content of the lignin derived oil was further reduced from 18.7 to 15.1, indicating that this also applies to the combined feedstock.

The invention claimed is:
1. A process for converting lignin to renewable liquid product(s), characterized in that the process comprises the following steps,
    (a) providing a lignin feedstock (10);
    (b) providing a solid second renewable feedstock;
    (c) providing a solvent (20) comprising an oil fraction, at least partly produced by the process;
    (d) preparing a feed mixture (30) by mixing a combined feedstock of the lignin feedstock (10) of step (a) and the second renewable feedstock of step (b) with the solvent (20) of step (c), wherein the ash content of the combined feedstock is below 4.5 wt %;
    (e) followed by solvolysis of the feed mixture of step (d) by heating (110) the feed mixture (30) at a temperature between 360 and 420 ° C., under a pressure from 40 to 155 bar and maintaining said temperature and pressure for 2-60 minutes to obtain a product mix (40); and
    (f) recirculating at least part of said product mix (40) as the oil fraction of said solvent (20) of step (c).
2. The process according to claim 1, characterized in that the lignin feedstock is lignin fraction(s) having an average molecular weight below 6500 g/mol.
3. The process according to claim 1, characterized in that the solid second renewable feedstock is solid forest industry residues.
4. The process according to claim 1, characterized in that the lignin feedstock is kraft lignin separated from black liquor.
5. The process according to claim 1, characterized in that the ash content of the combined feedstock is below 3 wt %.
6. The process according to claim 1, characterized in that the lignin feedstock (10) comprises 0.1-15 wt % ash.
7. The process according to claim 1, characterized in that the forest industry residue comprises 0.1-5 wt %. ash.
8. The process according to claim 1, characterized in that the feed mixture (30) of step (d) is prepared by mixing (100) the combined feedstock and solvent (20), at a temperature between 100 and 130° C., under at a pressure from 1 bar to 10 bar, for 5-30 min.
9. The process according to claim 4, characterized in that the feed mixture is subjected to filtration before step (e) and a feed mixture of lignin fraction(s) and solvent is obtained as filtrate.

10. The process according to claim 1, characterized in that the process is a continuous, batch or semi-batch process.

11. The process according to claim 1, characterized in that the process further comprises separating (120) a liquid product mix (50) from said product mix (40).

12. The process according to claim 1, characterized in that step (b) separation (120) is followed by fractionation (200) to obtain one or more oil fraction(s) (60, 61) and a heavy fraction (62) and optionally a bottom residue fraction (63) and/or a gaseous fraction and optionally recirculating one oil fraction (60) as the oil fraction of the solvent.

13. The process according to claim 1, characterized in that the oil fraction is a fraction obtained by fractionation (200) of the product mix (40) from the thermal liquefaction step (110) or of the liquid product mix (50) obtained after separation (120).

14. The process according to claim 6, characterized in that in that at least part of the oil fraction from said fractionation (200) is directed to a hydroprocessing step.

15. The process according to claim 1, characterized in that the amount of combined feedstock is 5 wt % to 35 wt % of the feed mixture.

16. The process according to claim 1, characterized in that combined feedstock consists of 10-90 wt % of the lignin feedstock and 10-90 wt % of the second renewable feedstock.

17. The process according to claim 1, characterized in that the solvolysis step (e) (110) is performed at a temperature from 360° C. to 420° C. and/or at a pressure from 50 to 150 bar.

18. The process according to claim 3, characterized in that preparing the feed mixture (30) step (d) is performed for 5-15 minutes and/or the solvolysis step (e) (110) is performed for 3-60 minutes.

19. A renewable product comprising the liquid product mix obtained by the process of claim 1.

20. A renewable product comprising the liquid product mix obtained by the process of claim 11.

21. A chemical, a marine fuel, or a drop-in fuel derived from the hydroprocessed oil obtained by the process of claim 14.

22. The process according to claim 1, characterized in that the lignin feedstock is lignin fraction(s) having an average molecular weight below 4000 g/mol.

23. The process according to claim 1, characterized in that the lignin feedstock is lignin fraction(s) having an average molecular weight below 2000 g/mol.

24. The process according to claim 1, characterized in that the lignin feedstock is lignin fraction(s) having an average molecular weight below 1500 g/mol.

25. The process according to claim 1, characterized in that the solid second renewable feedstock is bark, sawdust, wood chips, branches, treetops or mixtures thereof.

26. The process according to claim 1, characterized in that the solid second renewable feedstock is bark, sawdust, wood chips or mixtures thereof.

27. The process according to claim 1, characterized in that the amount of combined feedstock is 8 wt % to 25 wt % of the feed mixture.

28. The process according to claim 1, characterized in that the amount of combined feedstock is 10 to 20 wt % of the feed mixture.

29. The process according to claim 1, characterized in that the solvolysis step (e) (110) is performed at a temperature from 370° C. to 400° C. and/or at a pressure from 50 to 130 bar.

30. The process according to claim 3, characterized in that the solvolysis step (e) (110) is performed for 5-40 minutes.

31. The process according to claim 3, characterized in that the solvolysis step (e) (110) is performed for 5-30 minutes.

* * * * *